United States Patent [19]

Huber

[11] Patent Number: 4,850,768
[45] Date of Patent: Jul. 25, 1989

[54] TIEDOWN CHAIN

[75] Inventor: John R. Huber, Holicong, Pa.

[73] Assignee: Breeze Corporation, Union, N.J.

[21] Appl. No.: 186,710

[22] Filed: Apr. 19, 1988

Related U.S. Application Data

[63] Continuation of Ser. No. 88,001, Aug. 18, 1987, abandoned, which is a continuation of Ser. No. 940,166, Dec. 10, 1986, abandoned, which is a continuation of Ser. No. 853,367, Apr. 15, 1986, abandoned, which is a continuation of Ser. No. 756,556, Jul. 17, 1985, abandoned, which is a continuation of Ser. No. 560,530, Dec. 12, 1983, abandoned.

[51] Int. Cl.⁴ .................................... F16B 35/00
[52] U.S. Cl. ............................. 410/103; 59/84; 59/90; 24/116 R
[58] Field of Search ............ 59/78, 83, 84, 90, 93, 59/29, 31; 24/116 R; 410/103

[56] References Cited

U.S. PATENT DOCUMENTS

| | | | |
|---|---|---|---|
| 1,904,479 | 4/1933 | Lashar | 59/78 |
| 1,948,349 | 2/1934 | Hall | 24/116 R |
| 2,125,967 | 8/1938 | Taylor et al. | 59/29 |
| 2,304,938 | 12/1942 | Lutts et al. | 59/78 |
| 2,732,178 | 1/1956 | Chaney | 59/84 |
| 2,806,345 | 9/1957 | Phares | 59/29 |
| 2,903,767 | 9/1959 | Huber | 24/116 R |
| 3,027,614 | 4/1962 | Davis | 24/116 R |
| 3,410,085 | 11/1968 | Sheth | 59/84 |
| 4,129,285 | 12/1978 | Graham | 59/84 |

FOREIGN PATENT DOCUMENTS 50144 12/1888 Fed. Rep. of Germany ......... 59/84

*Primary Examiner*—David Jones
*Attorney, Agent, or Firm*—Christie, Parker & Hale

[57] ABSTRACT

An improved geometry for links used in a tiedown chain adapted for attachment to a widely used style of a chain tensioning and securing device. The links are nonreversible, and are longitudinally nonuniform to prevent inadvertent reversed insertion of the chain in the anchoring device.

20 Claims, 5 Drawing Sheets

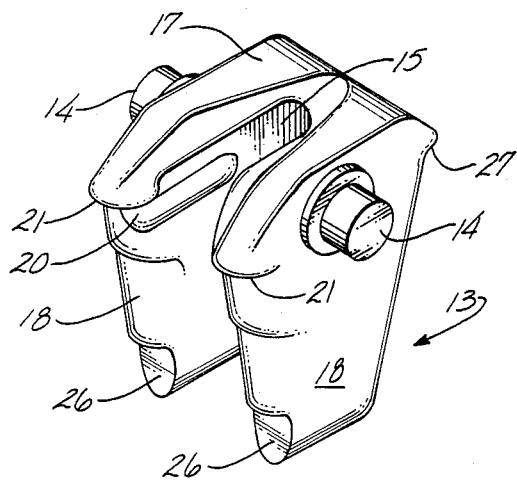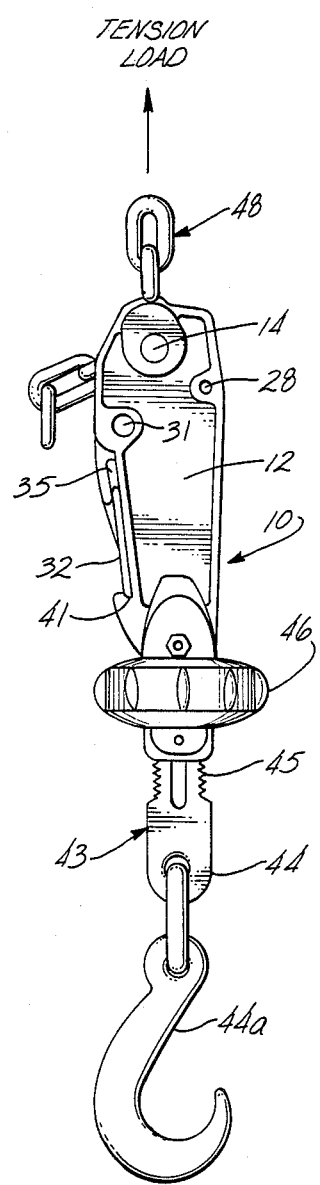

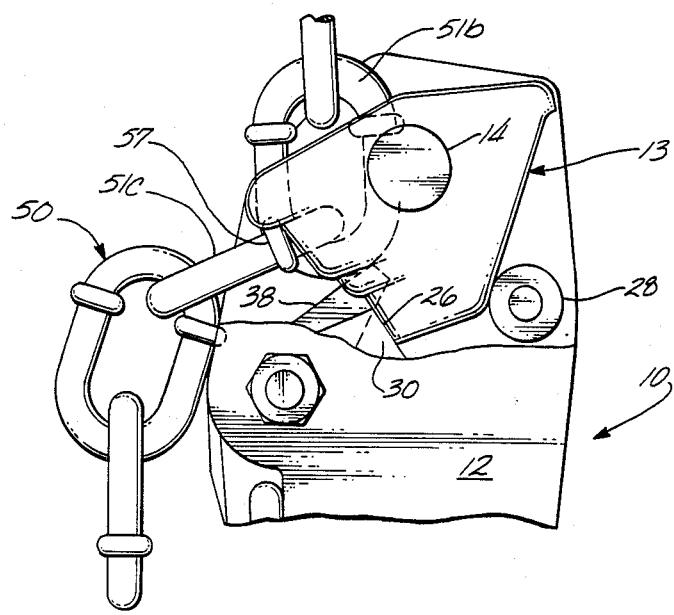

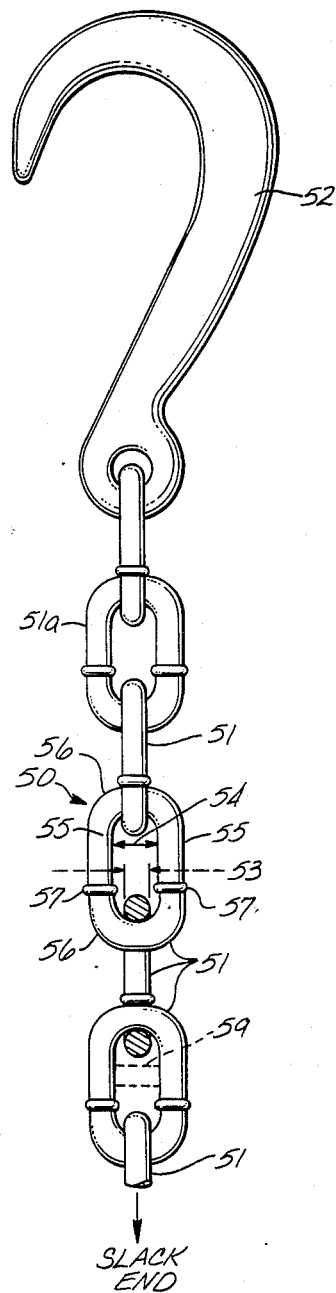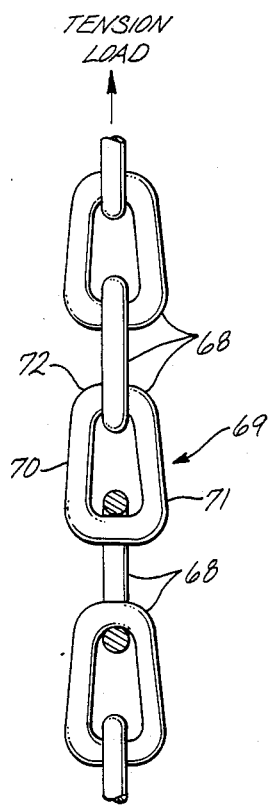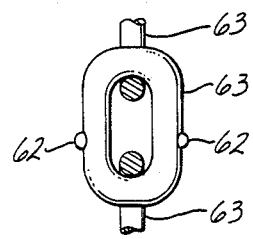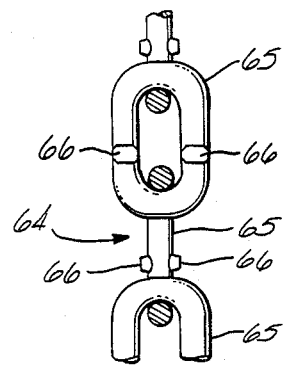

TIEDOWN CHAIN

CROSS-REFERENCE TO RELATED APPLICATIONS

This a continuation of application 88,001 filed on 8/18/87 now abandoned which is a continuation of 940,155 now abandoned, which was filed on 12/10/86 which is a continuation of 853,367, now abandoned which was filed in 4/15/86 which is a continuation of 756,556, now abandoned, which was filed on 7/17/85, a continuation of 560,530, now abandoned which was filed 12/12/83.

BACKGROUND OF THE INVENTION

U.S. Pat. No. 2,903,767 discloses a chain tensioning and tiedown device which has come into widespread military use in fastening tiedown chains for diverse applications including securing loads such as airplanes and helicopters on the deck of an aircraft carrier. The device includes a pivotally mounted chain block defining an entrance path to receive a tensioned portion of the chain secured to the load. The block also defines an exit path from which the slack or free end of the chain emerges.

The securing device is designed to withstand heavy loading from a properly installed tensioned chain, but is less strong if the chain is inadvertently reversed during installation. That is, the structural strength of the overall tiedown system is compromised if the tensioned chain is incorrectly fed into the exit path of the chain block, and the slack free end emerges through the entrance path. Although tiedown devices of this type are placarded with a warning to avoid reverse installation of the chain, the incorrect reverse insertion can be and sometimes is made.

An important objective of this invention is to provide a novel "oriented" chain which is fully compatible with the large number of chain tiedown devices already in use, which requires no modification of the existing devices, and which prevents inadvertent reverse insertion of the chain in the device.

SUMMARY OF THE INVENTION

This invention is directed to what can be characterized as a "one way" chain having links between the end links which are nonreversible, and wherein the links are formed by two portions which are unsymmetrical and not mirror images of each other. These features are readily visualized in terms of a conventional chain link having a racetrack or oval shape.

Nonreversibility in a link of this type is most easily provided by making the lateral internal spacing of the link legs smaller than double the cross-sectional diameter of the typically round metal stock forming the link. Links having this geometry cannot be reversed because there is insufficient clearance space for the end portions of the adjoining links to exchange positions. Nonreversibility can also be provided by other link shapes (such as a wasp-waist link), by a lateral bar extending across the link, or by a protrusion which narrows the opening of the link.

In a chain with nonreversible links, it is possible to assign a directional sense to the links and the chain. One end of the chain can be designated as the load end, and the opposite end as the slack end when the chain is anchored to a tiedown device between its ends. Typically the load end is identified by the addition of a hook or other attachment fitting. A first end portion of each nonreversible link always faces the load end, and a second end portion of the link always faces the slack end.

The nonreversible links are further formed to be unsymmetrical or anisotropic to the extent that the link end portions are of different shape when viewed from a generally central part of the link. For example, the second end portions (facing the slack chain end) can be laterally enlarged (or enlarged in a direction normal to the main plane of the link) with respect to the corresponding dimension of the first end portion. Alternatively, one or more protrusions can be formed on the second end portions of the links.

When used in combination with the previously described chain tiedown device, the unsymmetrical nonreversible links can be engaged with the device only in a correct orientation with the tensioned load end extending from the device entrance path, and the slack chain end emerging from the exit path. Incorrect reverse installation of the chain is prevented because the link second ends cannot be seated in the device exit path, and latching of the device cannot be completed. No modification of the device itself is required to achieve this significant safety feature.

DESCRIPTION OF THE DRAWINGS

FIG. 2 is a pictorial view of a chain block used in the tiedown device;

FIG. 3 is a reduced-scale side elevation of the device;

FIG. 6 is a view similar to FIG. 5, but showing how the chain of this invention prevents inadvertent reverse installation;

FIG. 7 is an elevation, partly in section, of a tiedown chain according to the invention;

FIG. 8 is an elevation, partly in section, of a chain with another style of links;

FIG. 9 is an elevation, partly in section, of a third link style; and

FIG. 10 is an elevation, partly in section, of a fourth link style.

DESCRIPTION OF THE PREFERRED EMBODIMENT

The chain tensioning and securing device briefly described above is fully disclosed in U.S. Pat. No. 2,903,767 which is incorporated herein by reference. For convenience, however, a short description of the main structure is appropriate in this specification.

Figure 1:
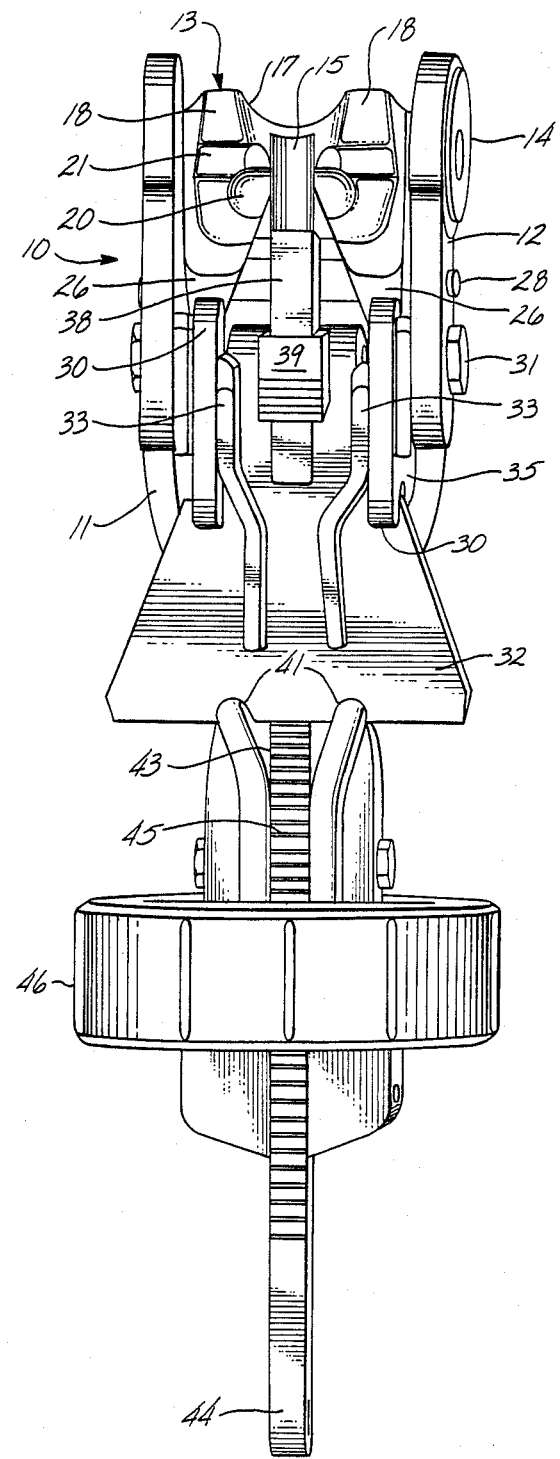
FIG. 1 is a pictorial view of a chain tensioning and tiedown device.

Referring to FIGS. 1 and 2, a chain tiedown and tensioning device 10 as shown in the aforementioned patent has a frame formed by spaced-apart side plates 11 and 12. A chain block 13 (shown in greater detail in FIG. 2) is pivotally supported between the side plates by trunnions 14. Block 13 has a chain entrance path defined by a slot 15 which is open at its forward end and extends vertically through the block, giving the block a somewhat U-shaped appearance when viewed from the top. An upper surface 17 of the block is concavely dished around the top of the slot, to provide clearance for the first chain link above the block, and opposed legs 18 of the block define the sidewalls of the slot.

A chain exit path of the block is defined by a pocket 20 which extends laterally into each leg 18 on opposite sides of slot 15. The upper forward portions of the legs form lips 21 which overhang the front of the pocket. As suggested by the chain links shown in phantom line in FIG. 5, the pocket is dimensioned to receive a portion of a roughly horizontal link having a major plane generally parallel to the axis of trunnions 14. Slot 15 is configured to receive a portion of a tensioned vertical link having a major plane generally perpendicular to the trunnion axis.

A shoulder 26 at the lower forward end of each leg 18 provides rotation stops for the block, and another shoulder 27 at the upper rear part of the block provides a stop for rotation in the opposite direction. A bar 28 (FIGS. 1, 3, and 4–6) is secured between frame side plates 11 and 12 to abut shoulder 27 for limiting block rotation in one direction when the device is unlatched, and bar 28 also limits rotation in the opposite direction when the device is either latched or unlatched by abutting the rear surfaces of legs 18.

A primary latch for the chain block is provided by a pair of spaced-apart cam plates 30 pivotally mounted on a shaft 31 secured to and extending between side plates 11 and 12. A primary latch handle 32 has a pair of upwardly extending legs 33 with elongated slots (not shown) receiving shaft 31, thereby rotatably supporting the handle on the shaft, and also permitting limited linear movement of the handle with respect to the shaft. An elongated slot 35 in the lower end of each cam plate 30 receives the platelike surface of handle 32 to couple the handle and cam plates, and to accommodate the linear movement of the handle.

A pawl or secondary latch 38 is rotatably and centrally positioned on shaft 31 between legs 33 of the primary latch handle. Latch 38 has an enlarged head 39 providing a thumbgrip surface, and also forming a rotation stop when the head abuts the front surfaces of legs 33. A spring (not shown) urges the head against these front leg surfaces, and also urges the primary latch handle linearly downwardly away from shaft 31. In this extended position, the lower end of the primary latch handle is captured in a pair of detent-like depressions 41 in side plates 11 and 12 when the primary latch is closed as shown in FIGS. 1 and 3.

An elongated and centrally slotted shank 43 extends between and downwardly away from side plates 11 and 12 to a lower end 44 adapted for connection to a hook 44a (FIG. 3) which secures the device to a supporting surface such as the deck of an aircraft carrier or the floor of a cargo airplane. Teeth 45 on opposite edges of the shank mate with internal teeth (not shown) on the inside of an adjusting wheel 46. Rotation of the wheel enables movement of the shank with respect to the device frame to adjust the overall length of the device for removing slack from an attached tiedown chain.

In use, a conventional tiedown chain 48 is engaged in the chain block 13 of the device as shown in FIG. 3. The tensioned part of the chain extends upwardly from the device entrance path (slot 15) to a load such as an aircraft being secured to a carrier deck. The slack tag end of the chain emerges from the device exit path (pocket 20). The tension load of the chain is transferred by the generally vertical link in slot 15 to the generally horizontal link which is trapped in pocket 20 of the relatively massive chain block. Rotation of the latched chain block is blocked by the upper ends of cam plates 30 which abut shoulders 26, and by bar 28 which abuts the rear surfaces of chain-block legs 18.

The tension load is thus transferred from trapped and generally horizontal link to the chain block, through trunnions 14 to side plates 11 and 12, and from the side plates through shank 43 to the supporting deck or other surface. The rear end of the horizontal link is trapped by blind pocket 20, and this link cannot escape the chain block in the rearward direction. Any relatively light force which might tend to urge the horizontal link forwardly out of pocket 20 is resisted because the tip of secondary latch 38 abuts the lower end of vertical link (FIG. 5), and thereby limits forward movement of the horizontal link. The heavy tension load of the tiedown chain urges the horizontal link into (rather than forwardly away from) and against the rear wall of pocket 20, and the secondary latch can be lightly constructed as it normally serves as little more than a keeper (and a quick release) for a lightly loaded or slack tiedown chain.

As described in detail in U.S. Pat. No. 2,903,767, the normal latched position of the device (with latch handle 32 seated in and retained by detents 41) locks the chain block against rotation. When the chain is to be released, the latch handle is moved upwardly to clear detents 41, and then rotated outwardly to move the tips of cam plates 30 out of abutting engagement with shoulders 26 of the chain block. This permits the chain block to rotate to a position where the chain slips out of the device. With a slack or lightly loaded chain, disengagement can also be achieved simply by rotating secondary latch 38 until the engaged links can be slipped out of the chain block.

Tiedown devices of the style of device 20 are ruggedly constructed, and have proven reliability in providing secure anchorage of heavy military aircraft in extreme conditions such as on the pitching deck of an aircraft carrier in heavy seas, or in a cargo aircraft in violently turbulent air. This reliability, however, depends on proper installation of the tiedown chain with the tensioned or load end of the chain extending from the chain-block entrance path, and the slack end extending from the exit path. In spite of personnel training and warning legends on the device itself, incorrect reverse installation has occurred, with a resulting compromise of the structural integrity of the device.

Figure 4:
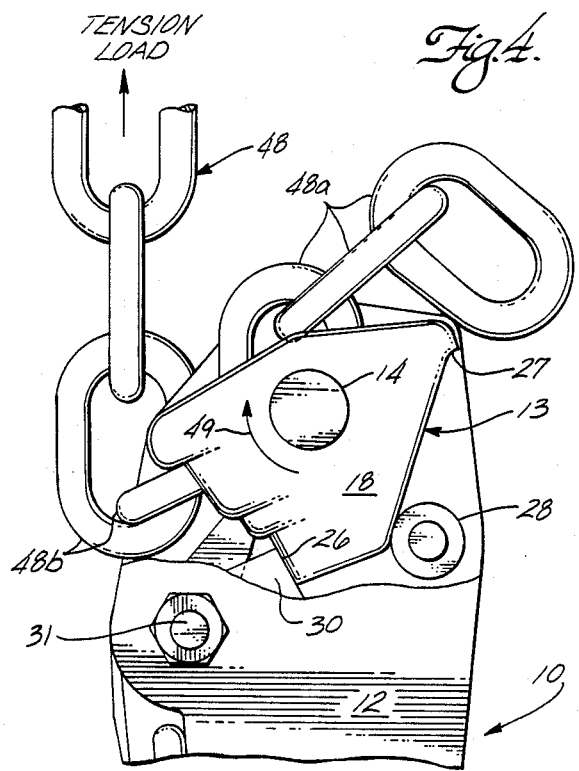
FIG. 4 is an enlarged view of the upper end of FIG. 3, showing the device partly broken away with an improperly installed conventional tiedown chain.
Figure 5:
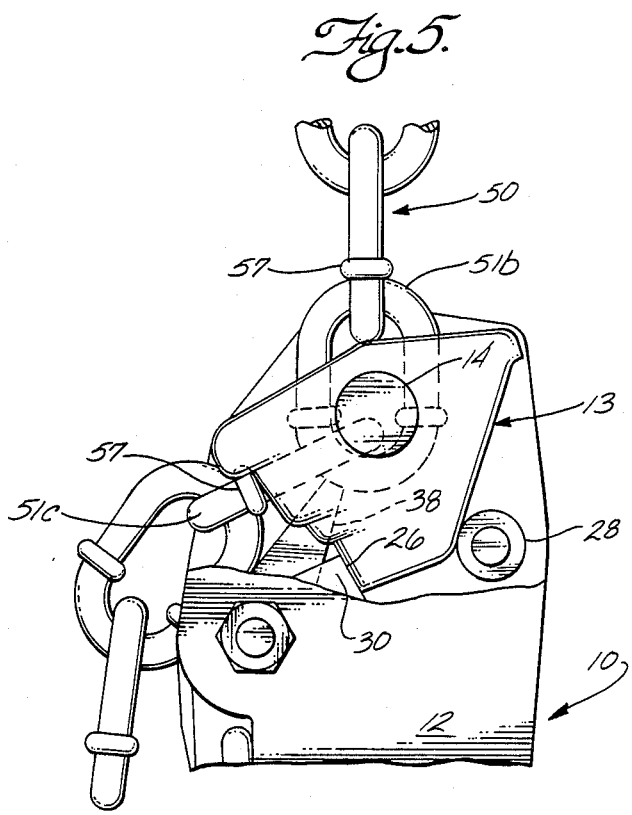
FIG. 5 is a view similar to FIG. 4, but showing the chain of this invention properly installed in the device.

A properly installed chain (FIGS. 3 and 5) transfers the chain load to trunnions 14 without imposing any significant moment of force tending to rotate chain block 13 clockwise (as seen in FIGS. 3 and 4–6) against the restraint of cam plates 30 bearing on shoulders 26. A small clockwise torque is intentionally provided to insure that the chain block will automatically rotate to an open position (in which the chain is released without further manipulation) when latch handle 32 is opened. This light torque load, however, is easily withstood by cam plates 30 when the latch handle is closed, and any unusual side loads on the slack end of the chain are resisted by the tip of secondary latch 38. Even without the secondary latch, a tensioned chain will be held captive in the chain block due to the inclination of pocket 20 (FIG. 5).

An improperly installed conventional chain 48 is shown in FIG. 4, with a slack end 48a emerging from slot 15 of chain block 13, and a tensioned end 48b extending from chain-block pocket 20. The line of action of the tension force is separated from the axis of trunnions 14 by a significant lever arm, resulting in a heavy torque load (arrow 49 in FIG. 4) on the chain block. When the tiedown chain is very heavily loaded, this torque or moment may lead to distortion or failure of the chain block, cam plates 30, or secondary latch 38, leading to separation of the chain from the tiedown device.

Consideration has been given to modifying the structure of the tiedown device to solve this problem, but no acceptable solution was achieved. It was then recognized by the present inventor that the problem could be corrected with a modified chain, and without requiring any modification of the numerous tiedown devices already in service. The solution is structurally effective, and is economically attractive in view of the relatively inexpensive and expendable nature of tiedown chains.

Referring to FIG. 7, a modified tiedown chain 50 according to the invention has a member of interconnected links 51. One end link 51a is engaged with a conventional hook 52 which is selected for connection to a fitting on the aircraft or other load to be secured. The opposite end of the tiedown chain simply terminates in a final link 51, and the location of hook 52 thus designates the load or tensioned end of the chain.

Links 51 are generally of conventional oval or racetrack shape, with two exceptions. First, the cross-sectional diameter (dimension 53 in FIG. 7) of each link is chosen to be more than one-half the internal spacing (dimension 54 in FIG. 6) of link legs 55 which are joined by curved link ends 56. Second, protrusions 57 are formed on the link legs toward the end of the link which faces away from the tensioned end of the chain.

As discussed above, the relationship between the link cross-sectional diameter and the link internal spacing gives the links the important property of nonreversibility. This property can be achieved in other ways (for example, by including in each link an internal protrusion or a central bar 59 shown in phantom in FIG. 7), but the aforesaid dimensional relationship is a simple and inexpensive way to accomplish the goal.

Protrusions 57 are dimensioned such that the link end bearing the protrusions cannot be inserted in pocket 20 of the chain block. As shown in FIG. 7, the protrusions are formed by annular ribs of weld metal on the links, with the outside diameter of the ribs being larger than the clearance space provided by pocket 20 in chain block. The protrusions need not, however, encircle the entire link, and a reliable alternative is to form only a laterally extending "bump" or external protrusion 62 on each leg of a link 63 as shown in FIG. 8. Protrusions 62 extend sideways from the link legs sufficiently to insure interference with the sidewalls of pocket 20, and thereby to block reverse insertion of the link.

The chain-link protrusion can thus be formed to extend laterally outwardly in the direction of the plane of the flat link, or can also be formed to extend away from the link in a direction perpendicular to the plane of the link. Tiedown chain 64 shown in FIG. 9 has links 65 with protrusions 66 oriented in this latter manner, but care must be taken to insure that the protrusions are limited in size to avoid interference with entry of the slack end of the link in slot 15 defining the entrance path into the chain block.

In either case, reverse insertion is blocked by interference of the protrusions with the walls defining pocket 20. Even a single protrusion can be used, but two protrusions are preferred to enable immediate visual identification of the link end facing the slack end of the chain.

Another alternative approach to the design of asymmetrical links 68 in a tiedown chain 69 is shown in FIG. 10. Rather than relying on a cross-sectional enlargement of the link legs as in links 51, 63, and 65, links 68 have a constant cross-sectional shape, but asymmetry is achieved by enlarging the lateral internal spacing of link legs 70 at a slack-chain end 71 as compared to the corresponding dimension at a load end 72 of the link.

This gives the link roughly the shape of a rounded-corner truncated triangle as shown in FIG. 10. End 71 is sized to be too large to fit into pocket 20, but smaller end 72 and the adjacent link-leg portions can be fully seated in the pocket. Nonreversibility of the link is maintained by keeping the lateral internal spacing of the link legs at slack end 71 less than double the cross-sectional dimension of the link.

FIG. 5 shows a tiedown chain 50 (of the style described above) as properly installed in chain block 13 of tiedown device 10. Vertical link 51b of the tensioned end of the chain is correctly fitted in slot 15 which is sufficiently wide to accommodate protrusions 57. A more nearly horizontal link 51c is seated in pocket 20 of the chain block, and protrusions 57 of this link do not interfere with full insertion of the link in the pocket.

FIG. 6 shows an attempt to install chain 50 in an improper reversed orientation in the tiedown device. Protrusions 57 on link 51c block insertion of this link in the chain-block pocket, preventing seating of the link and proper engagement of secondary latch 38 with vertical link 51b in slot 15. The operator is thus immediately warned of the incorrect chain orientation, and the chain is reversed for a correctly seated installation.

In the embodiments described above, the interference or blockage which prevents reverse insertion of the tiedown chain is between the device exit path defined by pocket 20 and an enlargement on the slack-chain end of the links. Conceptually, however, it is possible to provide the interference between the device entrance path and protrusions located at the load end of each link. This approach, however, requires a different geometry of the entrance and exit paths to insure that a properly oriented link can be fully seated in the exit path, and the configurations already described are accordingly preferred as no modification of the existing tiedown devices is needed.

The end of the tensioned portion of the chain is unambiguously designated to the user by the presence of a hook for attachment to the load to be secured. The opposed end of the chain can be permanently secured to the tiedown device if desired, or can simply be a free slack end. In the latter case, the chain should be of sufficient length that the end link on the slack end (which is reversible because engaged by only one adjacent link) will not be coupled to the tiedown device.

Even this possible ambiguity can be eliminated in several ways. First, the slack-end link can have a central bar or other means as described above to prevent reversal. Second, the final link, even though reversible, can be made circular or some other enlarged shape which cannot be received regardless of orientation in the pocket of the chain block.

There has been described an improved tiedown chain which eliminates inadvertent and unsafe reverse installation of the chain in a widely used style of chain tiedown and tensioning device. No modification of the device is required, and only a simple and relatively inexpensive change in the shape of the chain links is required to achieve this important objective.

What is claimed is:

1. An oriented chain comprising a plurality of serially arranged interlocked links including end links at opposite load and slack ends of the series and intermediate links between the end links, each intermediate link having a body comprised of substantially identically shaped curved ends and a pair of legs joining the ends on opposite side of an elongate central opening in the link, each intermediate link having length and width dimensions in a main plane of the link and a thickness dimension normal to the main plane, each intermediate link having load and slack end portions on opposite sides of the midlength of the link, each intermediate link in only one of the end portions thereof defining at least one projection thereon at a location spaced from the link midlength and which extends away from the link central opening in a direction generally parallel to at least one of the width and thickness dimensions of the link;

each intermediate link also being configured to be nonreversible relative to the links interlocked with it whereby the links between the end links are maintained in a predetermined orientation with the load ends thereof disposed toward the chain load end when the chain is extended.

2. An oriented chain according to claim 1 wherein, in each intermediate link, the spacing between the link legs in a widthwise direction across the link central opening is less than the sum of the cross-sectional dimensions of the proximate ends of the adjacent links interlocked with it.

3. An oriented chain according to claim 1 wherein said at least one projection is located on the slack end portion of each intermediate link.

4. An oriented chain according to claim 3 wherein there if a projection on each leg of each intermediate link.

5. An oriented chain according to claim 4 wherein each projection extends at least in a widthwise direction from the respective link leg away from the link central opening.

6. An oriented chain according to claim 5 wherein each projection is defined as an annular rib around the respective link leg.

7. An oriented chain according to claim 4 wherein the projections on the legs of each intermediate link are located on the link at substantially equal distances from the link midlength.

8. An oriented chain according to claim 3 wherein the projection is defined as an annular rib around a link leg.

9. An oriented chain according to claim 8 where the rib is located in the slack end portion of the link.

10. The combination of a link chain of selected nominal size engageable at a load end thereof to an article to be secured and a chain tiedown device engageable between the chain and a structure to which the article is to be secured, the tiedown device including a chain engaging member having therein an opening for receiving the chain at a location therealong between its load end and an opposite slack end, the chain when properly received in the member entering the opening from its load end and exiting the opening toward its slack end in a predetermined manner, the member defining in opposing surfaces of the opening a pair of opposing recesses shaped and spaced relative to each other for engaging in a selected way a link of said nominally sized chain along opposite sides thereof and for restraining the chain whose link is so engaged from moving through the opening in response to a load applied to the chain load end, the chain including a plurality of intermediate links between its slack and load ends which are each configured and dimensioned in cooperation with the immediately adjacent ones thereof engaged therewith that each such link is non-reversible relative to the immediately adjacent links whereby each such link has a load end always oriented toward the chain load end and an opposite slack end always oriented toward the chain slack end, the chain intermediate links being similarly asymmetrically configured in a predetermined way determined with reference to said recess shaping and spacing so that each intermediate link can be engaged in the recess is the selected way only when the chain is received in the opening of the chain engaging member in the predetermined manner.

11. Apparatus according to claim 10 wherein the recesses have first ends open toward the portion of the opening toward which a properly received chain exits from the opening and opposite closed ends proximate the portion of the opening through which a properly received chain enters the opening, and the asymmetry of the chain intermediate links is such that each such link can be engaged in the recesses only with its load end disposed toward the recess closed ends.

12. Apparatus according to claim 11 wherein the asymmetry of each intermediate link is provided by a projection extending from a slack end portion of the link at least in a direction other than into a central opening of the link and for a distance from the link sufficient, in combination with any other such projection on the link, to interfere with the recesses upon insertion of the link slack end into the recesses.

13. Apparatus according to claim 12 wherein the projection extends at least laterally from the link parallel to a main plane of the link.

14. Apparatus according to claim 12 wherein the projection extends from the link in a direction substantially perpendicular to a main plane of the link.

15. Apparatus according to claim 10 wherein the asymmetric configuration of each intermediate link is provided by at least one projection extending from the link at least in a direction other than into a central opening of the link.

16. Apparatus according to claim 15 wherein each intermediate link has a basic plane and length and width dimensions parallel to such plane, and the projection extends away from such plane.

17. Apparatus according to claim 15 wherein each intermediate link has a basic plane and length and width dimensions parallel to such plane, and the projection extends parallel to such plane.

18. Apparatus according to claim 10 where in each intermediate link has a pair of legs between the link load and slack ends on opposite sides of a central opening in the link, and the asymmetric configuration of each intermediate link is provided by an annular rib around at least one of the legs more proximate one of the link ends than to the other link end.

19. Apparatus according to claim 10 wherein each intermediate link has a main plane with link length and width dimensions parallel to the main plane, and the asymmetry of the link is provided by the link being wider at one end than the other end thereof.

20. Apparatus according to claim 10 wherein each intermediate link has a length between its load and slack ends, width and thickness dimensions normal to the length, and a central opening, and the asymmetric configuration of the link is provided by the link adjacent the slack end thereof being of increased dimension in a direction away from the link central opening parallel to at least one of its thickness and width dimensions.

* * * * *